(12) United States Patent
Tran

(10) Patent No.: US 7,630,342 B2
(45) Date of Patent: *Dec. 8, 2009

(54) SYSTEM AND METHOD FOR BALANCING COMMUNICATION TRAFFIC LOADING BETWEEN ADJACENT BASE STATIONS IN A MOBILE COMMUNICATIONS NETWORK

(75) Inventor: Phat H. Tran, Kitchener (CA)

(73) Assignee: Research In Motion Limited, Waterloo (CA)

( * ) Notice: Subject to any disclaimer, the term of this patent is extended or adjusted under 35 U.S.C. 154(b) by 393 days.

This patent is subject to a terminal disclaimer.

(21) Appl. No.: 11/412,494

(22) Filed: Apr. 27, 2006

(65) Prior Publication Data

US 2006/0194586 A1 Aug. 31, 2006

(51) Int. Cl.
*H04W 4/00* (2006.01)

(52) U.S. Cl. .................................. 370/332; 370/331

(58) Field of Classification Search ............. 370/230.1, 370/233, 234, 235, 252, 254, 331–334, 468; 455/453

See application file for complete search history.

(56) References Cited

U.S. PATENT DOCUMENTS

| 4,670,899 | A | | 6/1987 | Brody et al. |
| 5,448,569 | A | * | 9/1995 | Huang et al. ................. 370/332 |
| 5,809,430 | A | * | 9/1998 | D'Amico ..................... 455/525 |
| 5,862,124 | A | | 1/1999 | Hottinen et al. |
| 6,327,472 | B1 | * | 12/2001 | Westroos et al. ............. 455/450 |
| 6,732,163 | B1 | * | 5/2004 | Halasz ....................... 709/220 |
| 7,299,019 | B1 | * | 11/2007 | Austin et al. ............. 455/161.3 |
| 7,340,252 | B2 | * | 3/2008 | Fingerhut et al. ......... 455/435.1 |

FOREIGN PATENT DOCUMENTS

CA 1235459 4/1988

* cited by examiner

*Primary Examiner*—Wing F Chan
*Assistant Examiner*—Saba Tsegaye
(74) *Attorney, Agent, or Firm*—Jones Day; Krishna K. Pathiyal; Robert C. Liang

(57) ABSTRACT

A method for evaluating and balancing communication traffic loading in a mobile communications network includes a mobile communications device that detects a first signal strength from a current base station, and a current traffic indicator for the current base station. The mobile device also calculates a current base station adjusted signal strength indicator as a function of both the first signal strength and the current traffic indicator. The traffic indicator for an adjacent base station is identified, and the mobile device calculates an adjacent base station adjusted signal strength indicator as a function of both an adjacent base station signal strength and the traffic indicator for the adjacent base station. The current base station adjusted signal strength indicator is compared with the adjacent base station adjusted signal strength indicator to determine whether to roam to the adjacent base station.

20 Claims, 3 Drawing Sheets

SYSTEM AND METHOD FOR BALANCING COMMUNICATION TRAFFIC LOADING BETWEEN ADJACENT BASE STATIONS IN A MOBILE COMMUNICATIONS NETWORK

CROSS-REFERENCE TO RELATED APPLICATION

This application claims priority from and is related to an application entitled, "System And Method For Balancing Communication Traffic Loading Between Adjacent Base Stations In A Mobile Communications Network," U.S. application Ser. No. 10/119,078, filed Apr. 9, 2002, which claimed priority from a Provisional Application of the same title, U.S. Provisional App. No. 60/283,021, filed Apr. 11, 2001. These prior applications, including the entire written description and drawing figures, are hereby incorporated by reference into the present application.

FIELD OF THE INVENTION

This invention relates generally to the fields of mobile communications devices and mobile communications networks. More specifically, a system and method for balancing communication traffic loading between adjacent base stations in a mobile communications network are provided. Such systems and methods are particularly well-suited for use in Personal Digital Assistants, cellular telephones, and wireless two-way email communication devices (collectively referred to herein as "mobile communications devices").

BACKGROUND OF THE INVENTION

Known mobile communications systems, such as the Mobitex™ and DataTAC™ mobile communications system in North America, may include hundreds of base stations that provide cellular coverage for mobile communications devices. Since the coverage area for any base station is typically limited by factors such as base station power levels and environmental conditions, a communications device may have to establish communications via different base stations as it moves within the mobile communication network. This process of switching base stations is generally referred to as "roaming."

Various methods are known for controlling when a mobile communications device will roam from one base station to another. For example, in one typical roaming method, a mobile communications device monitors the signal strength of surrounding base stations in order to calculate a received signal strength indicator (RSSI) for the current and one or more adjacent base stations. The RSSI value of a current base station is then compared with the RSSI values of one or more adjacent base stations to identify possible roam candidate base stations. An adjacent base station, for example the adjacent base station with the highest RSSI value that is at least a certain threshold amount greater than the RSSI value of the current base station, may be selected as a roam candidate. The RSSI value of a roam candidate base station is typically compared with a pre-selected minimum threshold RSSI value, and if the RSSI of the roam candidate base station is greater than this threshold, then the mobile communications device roams to the roam candidate base station. However, this roaming method is inefficient, for example, in fleet distribution situations in which multiple base stations cover a large cluster of co-located mobile communications devices. In such situations, the fleet of mobile communications devices will typically gravitate towards the base station with the strongest RSSI, potentially overloading that base station and leaving other base stations under-utilized.

SUMMARY

A system for balancing communication traffic loading between adjacent base stations in a mobile communications network includes a mobile communications device having a communications subsystem, a processing device, a roaming software module, a storage device, and an RSSI adjustment sub-module. The communications subsystem is configured to receive signals from a current base station and one or more adjacent base stations. The processing device is coupled to the communications subsystem. The roaming software module executes on the processing device and monitors a first signal strength and a current traffic indicator from the current base station and monitors a second signal strength for each of the one or more adjacent base stations. The storage device is coupled to the processing device and stores a recorded traffic indicator for each adjacent base station. The RSSI adjustment sub-module executes on the processing device and calculates a first adjusted signal strength indicator as a function of both the first signal strength and the current traffic indicator and calculates a second adjusted signal strength indicator as a function of both the second signal strength and the recorded traffic indicator for each adjacent base station. The roaming software module compares the first adjusted signal strength indicator with each second adjusted signal strength indicator to control whether the mobile communications device roams from the current base station to an adjacent base station.

DETAILED DESCRIPTION

Figure 1:
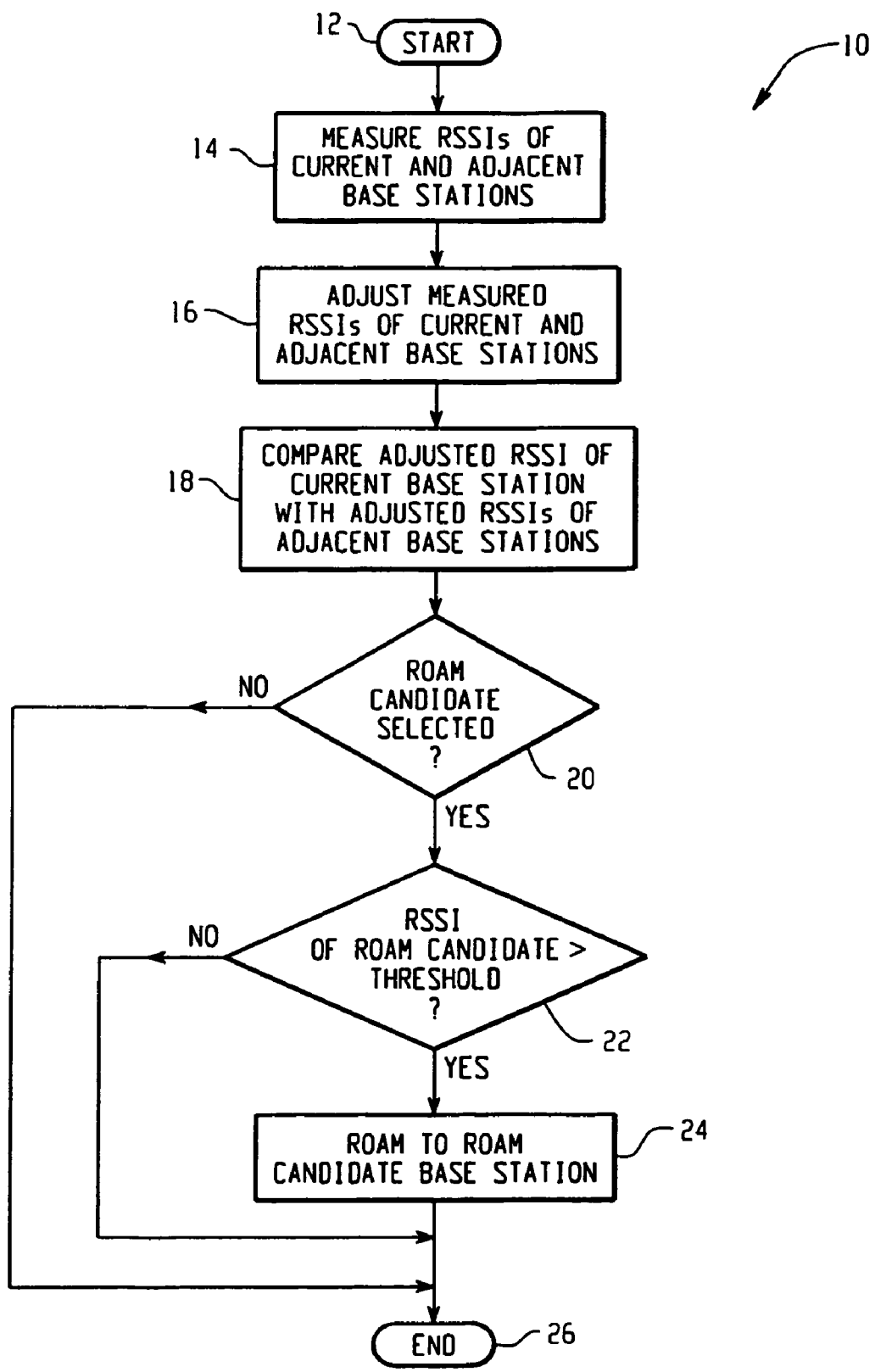
FIG. 1 is a flow diagram of an exemplary roaming method that utilizes an adjusted RSSI value.

Referring now to the drawing figures, FIG. 1 is a flow diagram of an exemplary roaming method 10 that utilizes an adjusted RSSI value. The method starts at step 12. At step 14, the mobile communications device measures the signal strength of its current base station and one or more adjacent base stations (base stations with overlapping coverage), and calculates a signal strength indicator, such as an RSSI value, for each base station. Methods of measuring the signal strength of a base station and calculating a signal strength indicator, such as an RSSI value, from the signal strength measurement are well-known in the field of mobile communications.

In step 16, the signal strength indicator for each base station is adjusted by an amount dependent upon the current loading of the base station. The adjusted signal strength indicator (RSSI_ADJ) is calculated using the measured signal strength indicator (RSSI) and a base station traffic indicator, such as a trafnum value in the Mobitex™ network. Based on the traffic indicator, the RSSI value of a base station may be adjusted upward or downward, depending upon its loading.

An exemplary method for calculating the adjusted signal strength indicator (RSSI_ADJ) is described below with reference to FIG. 2.

At step 18, the RSSI_ADJ value of the current base station is compared with the RSSI_ADJ values of one or more adjacent base stations to identify possible roam candidate base stations. The adjacent base station with the highest RSSI_ADJ value that is also at least a certain threshold amount greater than the RSSI_ADJ value of the current base station is selected as a roam candidate at step 20. If none of the adjacent base stations meet this criterion, however, then no roam candidate is selected and the method ends at step 26.

If a roam candidate is selected in step 20, then its RSSI is compared with a pre-selected minimum threshold RSSI value at step 22. If the RSSI of the roam candidate base station is not greater than this minimum threshold value, then the method ends (step 26) and the mobile communications device remains on its current base station. If the roam candidate has an RSSI value greater than the minimum threshold, however, then the mobile communications device roams to the roam candidate base station at step 24.

In this embodiment, the minimum threshold measured in step 22 relates to the measured RSSI values, similar to known roaming methods. Since the minimum threshold in step 22 is associated with physical limitations of a mobile communications device, below which communication signals cannot be reliably transmitted and/or received, the measured RSSI values are preferably used. However, unlike traditional roaming methods, the initial selection of a possible roam candidate base station at step 18 is made on the basis of RSSI_ADJ values, as described above. Thus, the method of FIG. 2 effectively pre-processes or adjusts RSSI values of a current and one or more adjacent base stations, and uses the adjusted values to select roam candidate base stations.

In an alternate embodiment, adjusted values may be used for fewer roaming method operations. For instance, in step 20, a mobile communications device may determine whether the a possible roam candidate base station, selected based on its RSSI_ADJ value, has an RSSI value that is at least a certain threshold amount greater than the RSSI value of the current base station. Roam candidate base station selection is thereby based on RSSI_ADJ values, whereas the final determination as to whether the mobile communications device should roam to n adjacent base station is dependent upon relative RSSI values.

Figures 2, 3:
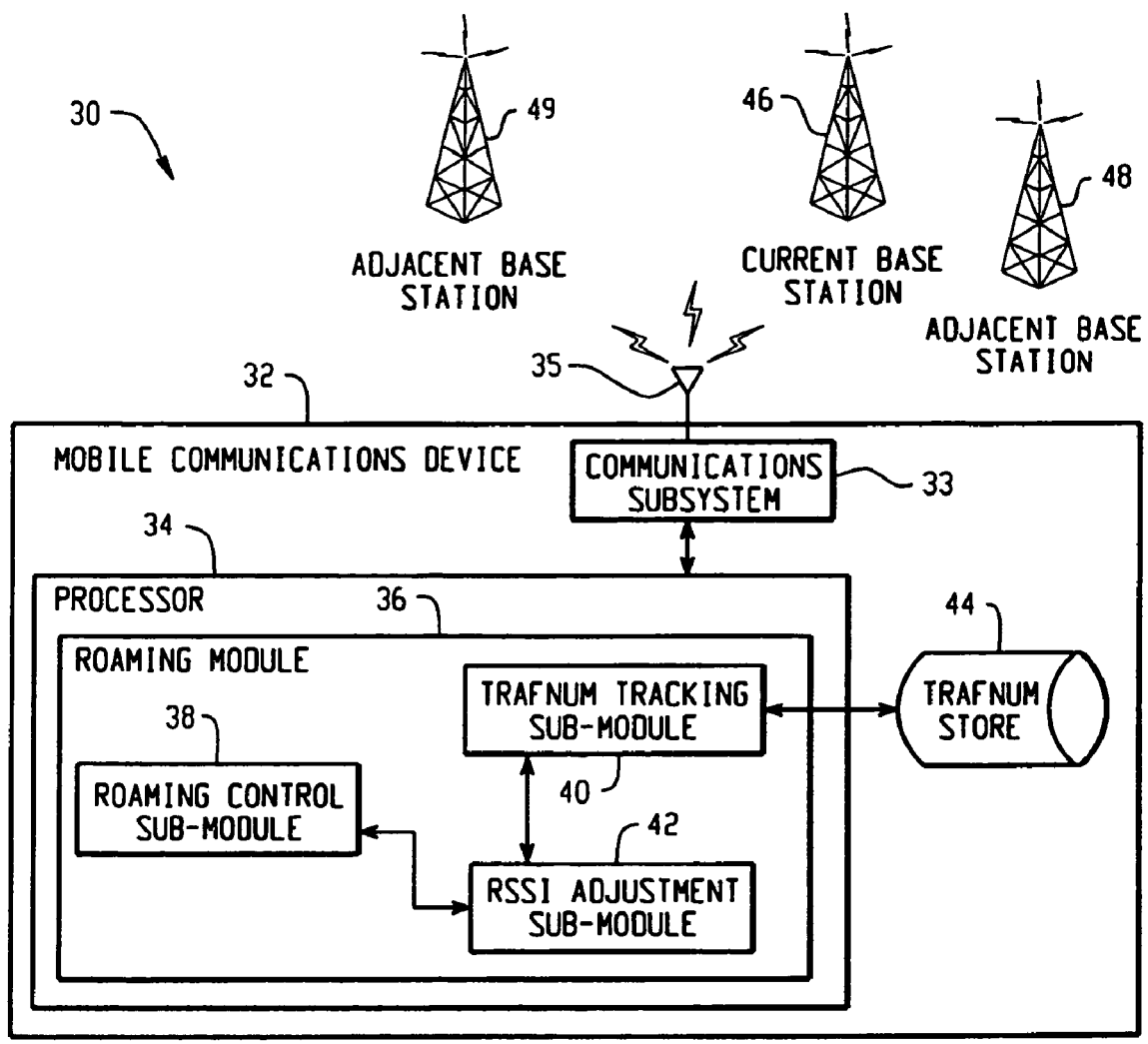
FIG. 2 is a block diagram of an exemplary roaming system for a mobile communications device.
FIG. 3 is a table illustrating exemplary attenuation values (in dB) corresponding to traffic indicator (trafnum) values from 0 to 12.

Adjusted values may similarly be used for more of the roaming operations shown in FIG. 2. The threshold value used in step 22 may also be adjusted, based on a trafnum value for a selected roam candidate base station for example, so that RSSI_ADJ values may be used throughout the roaming method. Because both RSSI and RSSI_ADJ values will typically be readily available however, roaming methods in which both RSSI and RSSI_ADJ values may provide the most efficient use of processing and memory resources.

FIG. 2 is a block diagram of an exemplary roaming system 30 for a mobile communications device 32. The mobile device 32 includes at least a processor 34, a communications subsystem 33, an antenna 35, and a storage device 44. The roaming system 30 includes a roaming module 36 and a trafnum store within the storage device 44. The roaming module 36 is preferably a software module executing on the processing device 34, and includes a roaming control sub-module 38, a trafnum tracking sub-module 40, and an RSSI adjustment sub-module 42. In one alternative embodiment, the roaming module 36 may instead execute on an additional processing device within the communications subsystem 33, such as a digital signal processor (DSP). Also illustrated is a current base station 46 and two adjacent base stations 48 and 49.

The term "trafnum" is commonly used to denote a traffic indicator in the Mobitex network, and is used generically throughout this application to refer to traffic indicators and related devices, such as the trafnum store 44 and trafnum tracking sub-module 40. It should be understood, however, that the present invention is not limited to use with the Mobitex™ network, and other specific traffic indicators may be substituted where appropriate.

The roaming control sub-module 38 monitors signals received by the communications subsystem 33 from both the current base station 46 and one or more adjacent base stations 48, and measures an RSSI value for each signal. In addition, the roaming control sub-module 38 identifies a base station traffic indicator from the current base station 46. For example, in the Mobitex network, mobile communications devices enter an idle state when not in use and access the network only occasionally to receive a list of identifiers for devices that have traffic pending from the base station. This scheme conserves device power, but enables the device to determine when it has traffic pending from the base station by monitoring the list of identifiers for its own identifier. The size of this list of identifiers, commonly referred to as a trafnum, is dependent upon the number of devices that have traffic pending at the base station, and thus is a reliable indicator of the load on the base station. A stable traffic indicator for a current base station 46 on the Mobitex network may, for example, be calculated by averaging the trafnum values for a base station extracted from multiple control frames, such as SVP6 frames.

The roaming control sub-module 38 is typically able to monitor only the trafnum value for the current base station 46. Therefore, as the mobile communications device 32 roams between base stations 46, 48, the trafnum tracking sub-module 40 records the trafnum value from the current base station 46 in the trafnum store 44. For instance, if the mobile communications device 32 has recently roamed from the adjacent base station 48, then the last trafnum value detected from that base station 48 will be recorded by the trafnum tracking sub-module 40 in the trafnum store 44. In addition, the recorded trafnum values 44 are decreased or "aged" over time by the trafnum tracking sub-module 40 such that a stored trafnum value will be reduced to zero (0) after a predetermined aging time interval. For instance, if the aging time interval is 120 minutes, then the trafnum aging function may be performed by the trafnum tracking sub-module 40 using a linear aging formula such as:

$$trafnum\_aged = trafnum\_recorded * (120 - time\_elapsed) / 120.$$

It should be appreciated that although this formula represents linear aging, other aging characteristics may also be desirable and may be adapted according to communication network operator or mobile communications device owner preferences, for example. An exemplary non-linear trafnum aging scheme would involve maintaining a trafnum value in the trafnum store 44 for a predetermined period of time, and then reducing the trafnum value to zero at the expiry of the predetermined period. Other aging techniques may also be used.

The storage of trafnum values by the trafnum tracking sub-module 40 reduces the occurrence of "ping-pong" roaming of mobile communication devices 32 between congested base stations. The aging of trafnum values allows a device to retry congested base stations after permitting time for the congestion to potentially abate. Consequently, the rate of trafnum aging affects the rate of "ping-pong" roaming. An aging time interval may, for example, be adjusted automatically by the trafnum tracking sub-module 40 or may be responsive to a control input from a network operator, a mobile communications service provider, or a mobile device user.

The RSSI adjustment sub-module 42 receives the appropriate RSSI values and trafnum values from the roaming control sub-module 38, and calculates the RSSI_ADJ values for the current and adjacent base stations 46, 48. If no trafnum value has been recorded for a particular base station (because the mobile communications device 32 has never roamed there), then the base station is assigned a default trafnum value, such as zero (0). The RSSI adjustment sub-module 42 may, for example, calculate the RSSI_ADJ values using the equation:

$$RSSI_{ADJ} = RSSI - MAX(0, MIN(12, \text{offset})),$$

where offset=2*(trafnum−3).

The value of the term "MAX(0, MIN(12, offset))" in the above equation represents the amount by which the RSSI value is attenuated (in dB) depending upon the traffic load on the base station. The "MIN" component of the equation term "MAX(0, MIN(12, offset))" sets the maximum attenuation at 12 dB, and provides an "offset" term which in this example provides for attenuation increments of 2 dB and establishes a trafnum of 3 as a threshold loading at or below which a base station's RSSI will not be attenuated. It should be understood, however, that the values used in the above equation were selected for illustrative purposes only, and are not intended as a limitation of the claimed invention. It should also be understood that the RSSI adjustment sub-module 42 may calculate the RSSI_ADJ values using other equations. For example, an analogous equation may instead be used for increasing the RSSI of base stations with relatively low traffic loads.

Thus, the roaming module 36 may store or input both RSSI and RSSI_ADJ values for a current base station 46 and a plurality of adjacent base stations, 48 and 49. For each base station, these values may be stored or input as triplets including a base station identifier, an RSSI value, and an RSSI_ADJ value. The RSSI and RSSI_ADJ may then be processed as described above to identify roam candidates and to determine whether a mobile communications device should roam to one of the roam candidates. As those skilled in the art will appreciate, known roaming modules and algorithms use only RSSI values to make such determinations.

FIG. 3 is a table 50 illustrating exemplary attenuation values (in dB) 54 corresponding to trafnum values 52 from 0 to 12. The values listed in the table 50 were calculated using the "MAX(0, MIN(12, offset))" term of the RSSI_ADJ equation described above, including the selected maximum, increment and threshold values. As illustrated in the table 50, the "offset" component of the equation maintains an attenuation 54 of 0 dB until the trafnum 52 reaches a value of 4. Once the trafnum value 52 reaches 4, the attenuation value 54 increases by the selected increment of 2 dB until the selected maximum attenuation level of 12 dB is reached at a trafnum value of 9. The selected maximum attenuation level 54 of 12 dB is then maintained for the remaining trafnum values 52 from 9 to 12.

Figure 4:
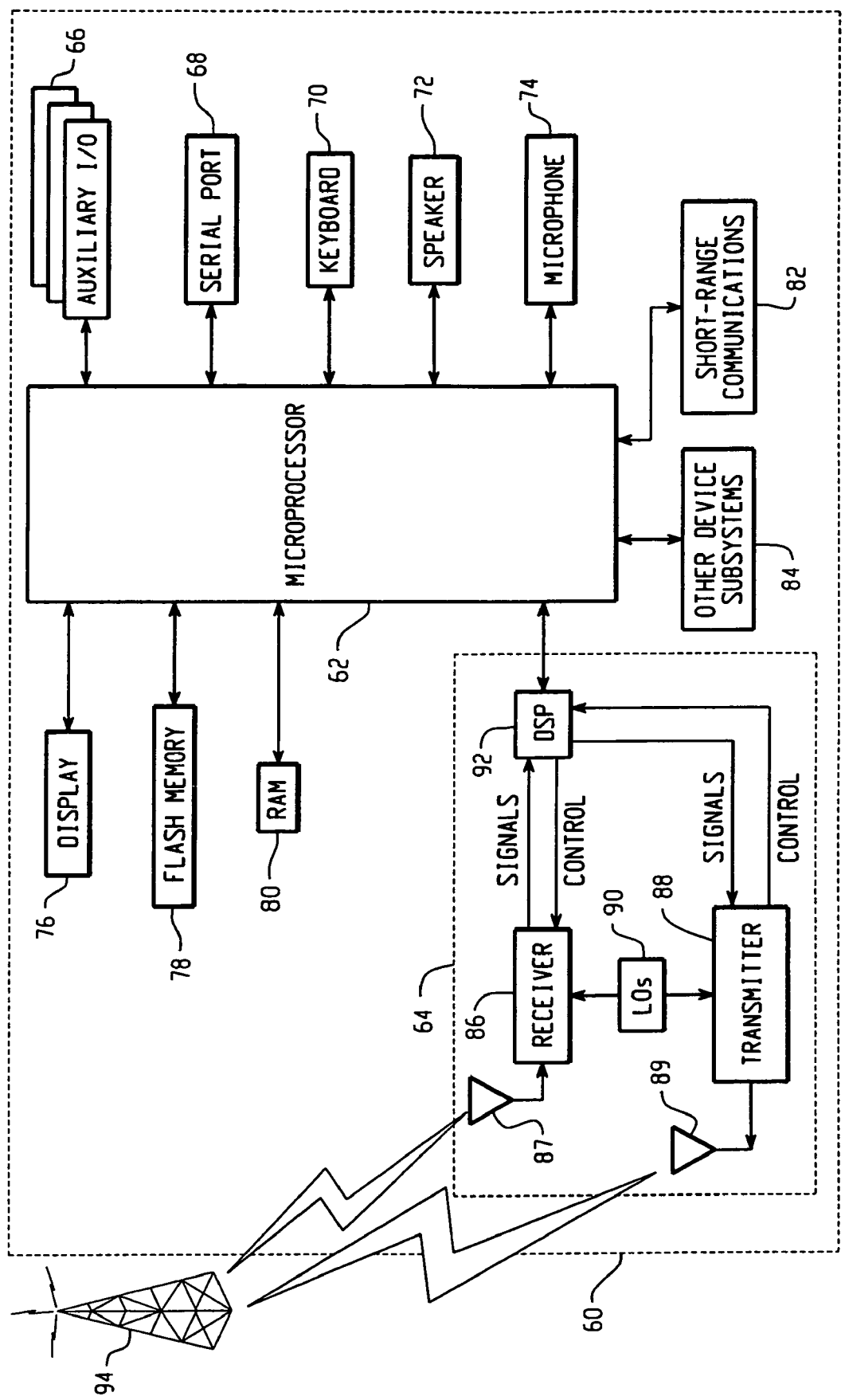
FIG. 4 is a more detailed block diagram of one exemplary mobile communications device that may utilize the exemplary roaming system shown in FIG. 2.

FIG. 4 is a more detailed block diagram of one exemplary mobile communications device 60 that may utilize the exemplary roaming system 30 shown in FIG. 2. The mobile communications device 60 includes a processing device 62, a communications subsystem 64, a short-range communications subsystem 82, input/output devices 66-76, memory devices 78, 80, and various other device subsystems 84. The mobile communications device 60 is preferably a two-way communication device having voice and data communication capabilities. In addition, the device 60 preferably has the capability to communicate with other computer systems via the Internet.

The processing device 62 controls the overall operation of the mobile communications device 62. System software executed by the processing device 62, including the roaming software module 36 described above with reference to FIG. 2, is preferably stored in a persistent store such as a flash memory 78, but may also be stored in other types of memory devices, such as a read only memory (ROM) or similar storage element. In addition, system software, specific device applications, or parts thereof, may be temporarily loaded into a volatile store, such as a random access memory (RAM) 80. Communication signals received by the mobile device may also be stored to RAM 80.

The processing device 62, in addition to its operating system functions, enables execution of software applications on the device 60. A predetermined set of applications that control basic device operations, such as data and voice communications, may be installed on the device 60 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 94. Preferably, the PIM data items are seamlessly integrated, synchronized and updated via the wireless network 94 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 64, and possibly through the short-range communications subsystem 82. If the mobile communications device 60 is enabled for two-way communications, then the communication subsystem 64 includes a receiver 86, a transmitter 88, and a processing module, such as a digital signal processor (DSP) 92. In one alternative embodiment, the roaming software module 36 described above may be executed by the DSP 92. In addition, the communication subsystem 64, configured as a two-way communications device, includes one or more, preferably embedded or internal, antenna elements 87, 89, and local oscillators (LOs) 90. The specific design and implementation of the communication subsystem 64 is dependent upon the communication network in which the mobile device is intended to operate. For example, a device destined for a North American market may include a communication subsystem 64 designed to operate within the Mobitex mobile communication system or DataTAC mobile communication system, whereas a device intended for use in Europe may incorporate a General Packet Radio Service (GPRS) communication subsystem.

Network access requirements vary depending upon the type of communication system. For example, in the Mobitex and DataTAC networks, mobile communications devices 60 are registered on the network using a unique personal identification number or PIN associated with each device. In GPRS networks, however, network access is associated with a subscriber or user of a device 60. A GPRS device therefore requires a subscriber identity module, commonly referred to as a SIM card, in order to operate on a GPRS network.

When required network registration or activation procedures have been completed, the mobile communications device 60 may send and receive communication signals over the communication network. Signals received by the antenna 87 through the communication network 94 are input to the receiver 86, which may perform such common receiver functions as signal amplification, frequency down conversion, filtering, channel selection, and analog-to-digital conversion. Analog-to-digital conversion of the received signal allows the DSP 92 to perform more complex communication functions, such as demodulation and decoding. In a similar manner, signals to be transmitted are processed by the DSP 92, and are the input to the transmitter 88 for digital-to-analog conversion, frequency up-conversion, filtering, amplification and transmission over the communication network 94 via the antenna 89.

In addition to processing communication signals, the DSP 92 provides for receiver 86 and transmitter 88 control. For example, gains applied to communication signals in the receiver 86 and transmitter 88 may be adaptively controlled through automatic gain control algorithms implemented in the DSP 92.

In a data communication mode, a received signal, such as a text message or web page download, is processed by the communication subsystem 64 and input to the processing device 62. The received signal is then further processed by the processing device 62 for output to a display 76, or alternatively to some other auxiliary I/O device 66. A device user may also compose data items, such as e-mail messages, using a keyboard 70, such as a QWERTY-style keyboard, and/or some other auxiliary I/O device 66, such as a touchpad, a rocker switch, a thumb-wheel, or some other type of input device. The composed data items may then be transmitted over the communication network 94 via the communication subsystem 64.

In a voice communication mode, overall operation of the device 60 is substantially similar to data communication mode, except that received signals are output to a speaker 72, and signals for transmission are generated by a microphone 74. Alternative voice or audio I/O subsystems 84, such as a voice message recording subsystem, may also be implemented on the device. In addition, the display 76 may also be utilized in voice communication mode, for example to display the identity of a calling party, the duration of a voice call, or other voice call related information.

The short-range communications subsystem 82 enables communication between the mobile communications device 60 and other proximate systems or devices, which need not necessarily be similar devices. For example, the short-range communications subsystem 82 may include an infrared device and associated circuits and components, or a Bluetooth™ communication module to provide for communication with similarly-enabled systems and devices.

This written description uses examples to disclose the invention, including the best mode, and also to enable any person skilled in the art to make and use the invention. The patentable scope of the invention is defined by the claims, and may include other examples that occur to those skilled in the art. For example, the system may utilize base station signal power measurements or indicators other than the RSSI value and base station traffic indicators other than the trafnum value as roaming criteria.

I claim:

1. A method for evaluating communication traffic loading between adjacent base stations in a mobile communications network, comprising the steps of:
   detecting a first signal strength from a current base station with a mobile communications device;
   detecting traffic loading information for the current base station;
   calculating a current base station adjusted signal strength indicator as a function of at least the first signal strength and the traffic loading information for the current base station;
   identifying traffic loading information for an adjacent base station;
   calculating an adjacent base station adjusted signal strength indicator as a function of at least an adjacent base station signal strength and the traffic loading information for the adjacent base station; and
   comparing the current base station adjusted signal strength indicator with the adjacent base station adjusted signal strength indicator to determine whether to roam to the adjacent base station.

2. The method of claim 1, wherein the steps of identifying the traffic indicator for an adjacent base station, calculating the adjacent base station adjusted signal strength indicator, and comparing the current base station adjusted signal strength indicator with the adjacent base station adjusted signal strength indicator are performed for each of a plurality of adjacent base stations.

3. The method of claim 1, comprising the further steps of:
   calculating a first signal strength indicator for the current base station from the first signal strength, wherein the current base station adjusted signal strength indicator is calculated by adjusting the first signal strength indicator by a function of the current traffic indicator; and
   calculating a second signal strength indicator for the adjacent base station from the second signal strength, wherein the adjacent base station adjusted signal strength indicator is calculated by adjusting the second signal strength indicator by a function of the traffic indicator for the adjacent base station.

4. The method of claim 3, wherein the first and second signal strength indicators are received signal strength indicators (RSSIs).

5. The method of claim 3, comprising the further steps of:
   determining whether the adjacent base station adjusted signal strength indicator is greater than the current base station adjusted signal strength indicator by more than a pre-selected threshold amount; and
   if the adjacent base station adjusted signal strength indicator is not greater than the current base station adjusted signal strength indicator, then remaining on the current base station.

6. The method of claim 5, comprising the further steps of:
   if the adjacent base station adjusted signal strength indicator is greater than the current base station adjusted signal strength indicator by more than the pre-selected threshold amount, then comparing the adjacent base station adjusted signal strength indicator with a threshold value; and
   if the adjacent base station adjusted signal strength indicator is greater than the threshold value, then roaming from the current base station to the adjacent base station; and
   if the adjacent base station adjusted signal strength indicator is not greater than the threshold value, then remaining on the current base station.

7. The method of claim 5, comprising the further steps of:
if the adjacent base station adjusted signal strength indicator is greater than the current base station adjusted signal strength indicator by more than the pre-selected threshold amount, then comparing the second signal strength indicator with a pre-selected minimum threshold value; and
if the second signal strength indicator is greater than the pre-selected minimum threshold value, then roaming from the current base station to the adjacent base station; and
if the second signal strength indicator is not greater than the pre-selected minimum threshold value, then remaining on the current base station.

8. The method of claim 3, comprising the further steps of:
determining whether the second signal strength indicator is greater than the first signal strength indicator by more than a pre-selected threshold amount; and
if the second signal strength indicator is not greater than the first signal strength indicator by more than a pre-selected threshold amount, then remaining on the current base station.

9. The method of claim 8, comprising the further steps of:
if the second signal strength indicator is greater than the first signal strength indicator by more than the pre-selected threshold amount, then comparing the adjacent base station adjusted signal strength indicator with a threshold value;
if the adjacent base station adjusted signal strength indicator is greater than the threshold value, then roaming from the current base station to the adjacent base station; and
if the adjacent base station adjusted signal strength indicator is not greater than the threshold value, then remaining on the current base station.

10. The method of claim 1, wherein the current base station and adjacent base station traffic indicators are trafnum values.

11. The method of claim 10, wherein the recorded traffic indicator is decreased with time.

12. The method of claim 1, comprising the further step of:
recording the current traffic indicator if the mobile communications device roams from the current base station to the adjacent base station.

13. A mobile communications device, comprising:
means for receiving signals from a current base station and an adjacent base station;
means for processing data coupled to a communication subsystem;
means for monitoring a first signal strength and a current traffic indicator from the current base station and monitoring a second signal strength from the adjacent base station;
means for storing a recorded traffic indicator for the adjacent base station;
traffic indicator adjustment means for calculating a first adjusted signal strength indicator as a function of both the first signal strength and the current traffic indicator and calculating a second adjusted signal strength indicator as a function of both the second signal strength and the recorded traffic indicator; and
a roaming software module that compares the first adjusted signal strength indicator with the second adjusted signal strength indicator to control whether the mobile communications device roams from the current base station to the adjacent base station.

14. The mobile communications device of claim 13, further comprising:
means for storing the current traffic indicator in a storage device.

15. The mobile communications device of claim 14, wherein the means for storing the current traffic indicator in the storage device decreases the recorded trafnum indicator as a function of time.

16. The mobile communications device of claim 13, further comprising:
means for calculating a first signal strength indicator from the first signal strength and calculating a second signal strength indicator from the second signal strength;
wherein the traffic indicator adjustment means calculates the first adjusted signal strength indicator by increasing or decreasing the first signal strength indicator by a function of the current traffic indicator, and calculates the second adjusted signal strength indicator by increasing or decreasing the second signal strength indicator by a function of the recorded traffic indicator.

17. The mobile communications device of claim 13, wherein the mobile communications device is selected from the group consisting of: a Personal Digital Assistant, a cellular telephone, and a wireless two-way email communication device.

18. A method for evaluating communication traffic loading in a mobile communications network, comprising the steps of:
detecting a signal strength from an adjacent base station with a mobile communications device;
identifying a recorded traffic indicator for an adjacent base station;
calculating an adjacent base station adjusted signal strength indicator as a function of both the adjacent base station signal strength and the recorded traffic indicator for the adjacent base station;
wherein the adjacent base station adjusted signal strength indicator is used by the mobile device to determine whether to roam to the adjacent base station.

19. The method of claim 18, wherein the adjacent base station adjusted signal strength indicator is compared to a current base station's adjusted signal strength indicator to determine whether or not to roam to the adjacent base station.

20. The method of claim 18, wherein the mobile communications device is selected from the group consisting of: a Personal Digital Assistant, a cellular telephone, and a wireless two-way email communication device.

* * * * *

UNITED STATES PATENT AND TRADEMARK OFFICE
CERTIFICATE OF CORRECTION

PATENT NO. : 7,630,342 B2 Page 1 of 1
APPLICATION NO. : 11/412494
DATED : December 8, 2009
INVENTOR(S) : Phat H. Tran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Second Day of November, 2010

David J. Kappos
*Director of the United States Patent and Trademark Office*